July 26, 1927.

T. K. PETERS ET AL 1,636,834

ART OF EXHIBITING MOVING PICTURES

Original Filed Oct. 23, 1920   2 Sheets-Sheet 1

INVENTORS:-
T. K. Peters & T. C. Bartlam
BY
ATTORNEY

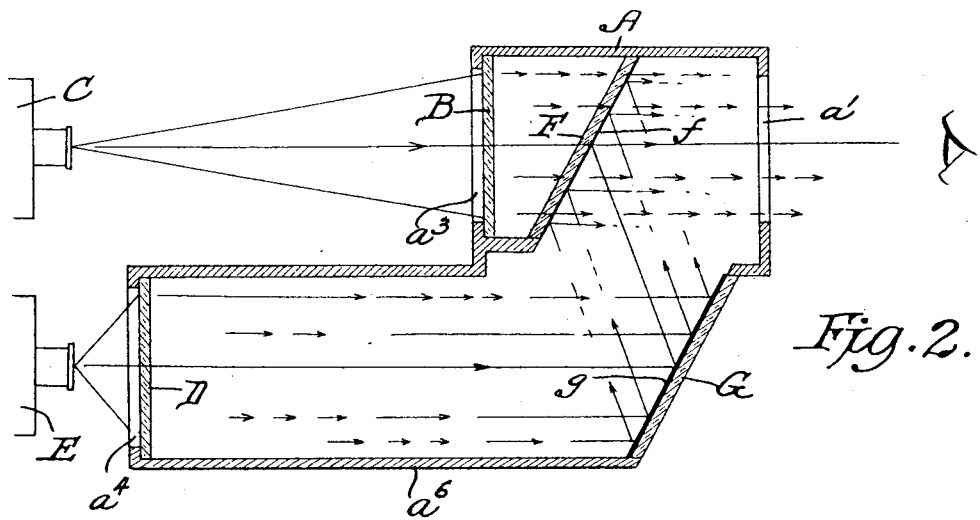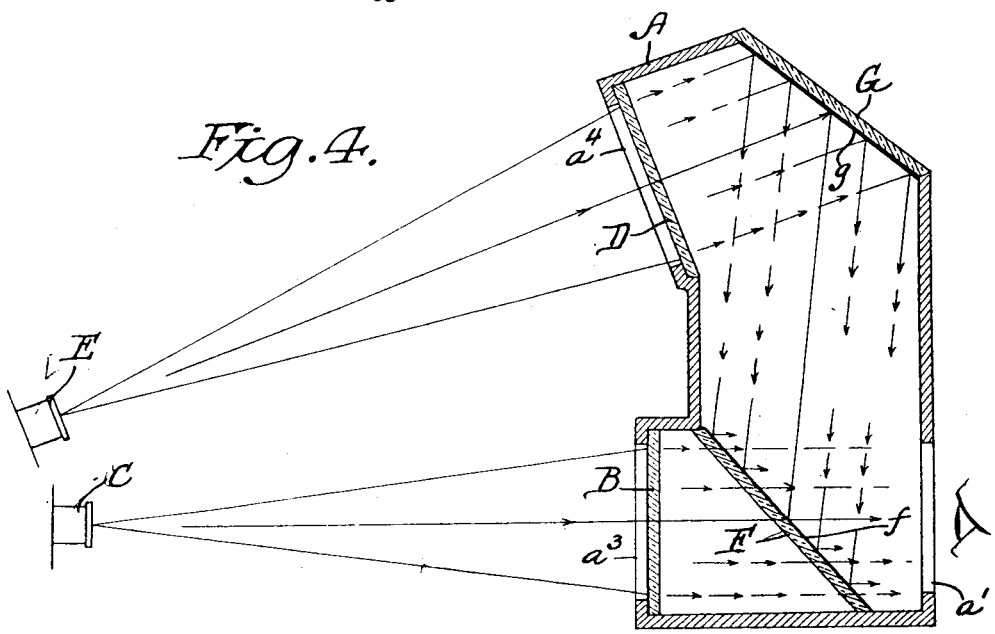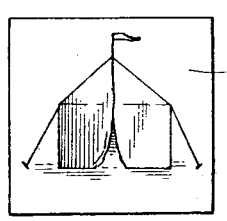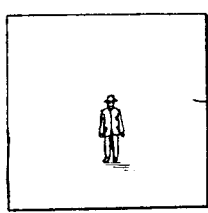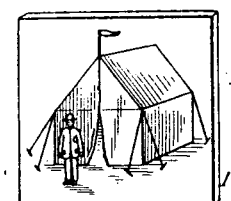

Patented July 26, 1927.

1,636,834

UNITED STATES PATENT OFFICE.

THOMAS K. PETERS AND THOMAS C. BARTLAM, OF NEW YORK, N. Y.

ART OF EXHIBITING MOVING PICTURES.

Application filed October 23, 1920, Serial No. 418,904. Renewed January 11, 1926.

This invention pertains to the art of exhibiting moving pictures wherein it is made to appear to the vision that there is an appreciable distance intermediate the pictures appearing in the foreground and in the background, whereby we are enabled to overcome the display on a screen of pictures all parts of which are displayed in the same plane.

According to the principles of this invention, a plurality of moving pictures are projected onto separate screens, one of which is in direct view of the audience, whereas the other picture or pictures are reflected so as to appear to the view of the audience, the two or more pictures thus exhibited directly and by reflection being apparently in superposed relation to each other, and in the line of vision and with an appreciable interval intermediate the picture representing the foreground and the pictures representing the background, so that this interval of separation between the foreground and the background is apparent to persons viewing the pictures at different angles and stationed in different parts of the audience.

The reflection of a moving picture by mirrors of usual form is attended ordinarily by an optical condition known as parallax wherein each part or subject of a picture is represented by double lines, this being occasioned by a double reflection from a single image, the lines of one reflection being due to the rays reflected at a definite angle from the front surface of the mirror and the other reflection due to the light rays passing through the mirror glass and reflected from the rear surface at a corresponding definite angle, the rays reflected separately from the front and the rear mirror surfaces being parallel, so that to the eye of the observer there is presented an image defined by double lines.

In the use of a mirror or mirrors of relatively large area for the exhibition of moving pictures in a theatre or other show place, the optical condition known as parallax is a serious factor, for the reason that for exhibition purposes a large sized mirror must be used, and the plate glass, or other media, is correspondingly thick and relatively heavy, hence provision must be made for precluding the optical condition of parallax. In our invention, we employ a mirror or mirrors the metallized surface of which is electrolytically deposited and subsequently etched to reduce the metal coating to a film of exceeding thinness, such form of mirror being desirably obtained by the electrolytic deposition of platinum, although other metals may be used and for convenience we will occasionally refer to such a mirror as a platinized mirror.

Assuming that the apparatus employs two projecting machines, the pictures in rapid succession are thrown onto two ground glass screens, one of which is in the full view of the audience, whereas the other screen is concealed from the view of the audience. The pictures representing the foreground are projected on the screen lying in the full view of the audience, whereas the pictures of the background are thrown on the concealed screen, in front of which concealed screen is a mirror the metallized surface of which is opposed to the background screen, said mirror being at an angle to the screen with which it is associated. In front of the screen on which the foreground pictures are projected is a second transparent mirror the metallized surface of which is in facing relation to the concealed mirror in front of the background screen, the two mirrors being parallel and the second mirror being at an angle to the foreground screen. Said second mirror, (the one in front of the foreground screen) is transparent so that the foreground pictures displayed on the screen in its rear is plainly visible to the audience, and against this second mirror is reflected the pictures representing the background, and thrown on the concealed screen by one projecting machine, such reflection being due to the action of the concealed mirror positioned in front of the concealed screen. It follows from the relation and organization of the projecting machines, the two screens, and the two mirrors that the foreground pictures are displayed on the screen positioned in rear of the transparent mirror, whereas the pictures representing the background are thrown on the concealed screen and reflected by the two mirrors so that we have appearing to the eye of a person in the audience two superposed pictures with an appreciable distance intervening the foreground pictures and the background pictures, which interval of separation is exhibited when viewed at different angles by persons at widely separated stations in the audience.

From what has been said it will be understood the pictures representing the foreground are thrown directly on a screen in full view of the audience and visible through a transparent mirror, whereas the pictures of the background are reflected by mirrors from a concealed screen, and although the background pictures are reflected by mirrors positioned in front of the plane of that screen on which is displayed the foreground pictures, the optical effect is that the background pictures (the reflected pictures) are visible in the rear of the directly thrown foreground pictures, such optical effect being due in part to the greater apparent intensity of the light from the projector associated with the foreground screen and in part to the loss in light rays arising from the double reflection afforded by the two mirrors.

Other features and functions of the invention will appear from the following description taken in connection with the drawings illustrating different embodiments of the invention, wherein—

Figure 2 is a similar view of another form of apparatus.

Figures 3 and 4 are similar views through other forms of apparatus, and

Figures 5, 6 and 7 are diagrammatic views showing the individual pictures on the two ground glass screens and a combination of such individual pictures in superposed relation.

Figure 1:
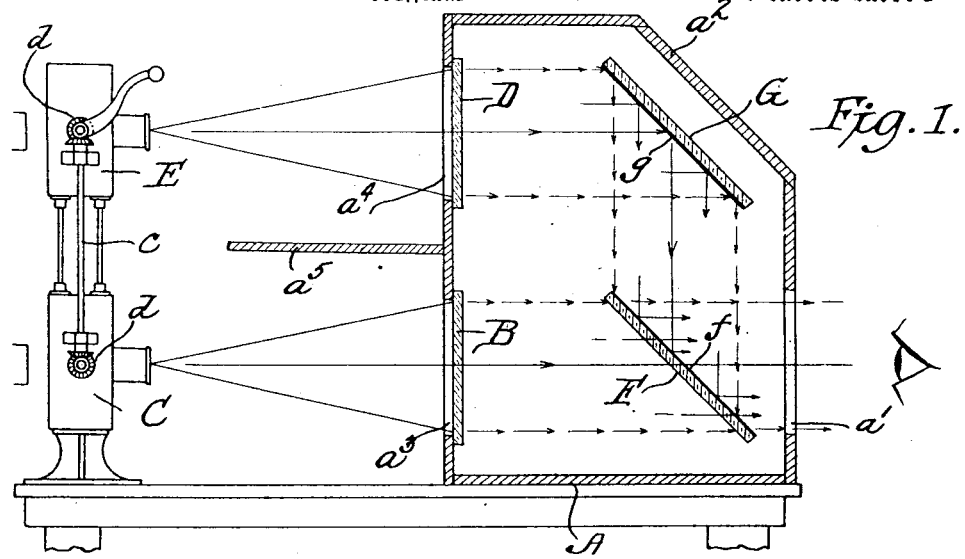
Figure 1 is a vertical section through one form of apparatus embodying the invention.

Referring to Figure 1, A is a suitable stage setting with a hood $a$ and an observation opening $a^2$. In the rear wall of the stage setting are openings $a^3$ $a^4$ with a horizontal light excluding wall $a^5$ intermediate the planes of said openings. Across the opening $a^3$ is a ground glass screen B positioned in the horizontal plane of the observation opening $a'$, and positioned rearwardly of the screen B is a projecting machine C operable for throwing a succession of moving pictures onto the screen B for depicting the foreground, said screen B being in the direct path of the beam of light from the projector C and said screen being in the line of the direct vision of the audience.

A ground glass screen D is positioned across opening $a^4$ and in the rear of the hood $a^2$ to be concealed thereby from the view of the audience, and in the rear of screen D is a second projecting machine E, the latter operating to throw onto screen D a succession of pictures representing the background. The projectors C-E may be of any desired construction known to those skilled in the art, and the action of the two projectors is synchronized by suitable means, the synchronizing means being of any approved form and diagrammatically represented by a shaft $c$ operatively connected by gears $d$ with the film sprockets (not shown) of the said projectors.

F is a transparent mirror positioned within the setting A and intermediate the screen B and observation opening $a'$, said mirror being of a transparent nature so that an observer seated in the audience is able to view the pictures thrown on screen B by projector C as indicated by the arrows. The mirror is at an angle to the vertical plane of the screen B, said mirror being composed of a glass slab of the appropriate dimensions and having a metallized surface $f$, as will presently appear.

G is a second mirror positioned within the setting and in rear of the hood $a^2$ thereof so as to be invisible to the audience, said mirror G being in front of the screen D and inclined at an angle thereto. Mirror G is provided with a metallized surface $g$, the latter being on that face of the glass slab of mirror G which faces or is opposed to the metallized surface $f$ of mirror F, the visible mirror F and concealed mirror G being positioned parallel to each other. The concealed mirror G is in front of screen D for reflecting the images thrown onto screen D by the projector E, and said mirror G thus acts to reflect the images depicting the background against the visible mirror F, the latter being in front of screen B, whereby the pictures thrown on screen D are reflected by mirrors G F into the view of the audience with the result that the pictures on screen B and the pictures thrown on screen D are reflected by the mirrors in a manner to display the two series of pictures in superposed relation and with an appreciable interval separating the foreground pictures from the background pictures, which interval of separation is perceptible at any angle of view by persons occupying different stations in the audience and the images or pictures so displayed to view being free from that optical condition known as parallax.

Each mirror F and G is prepared by using a glass slab of the required dimensions, and electrolytically depositing thereon a film of suitable metal, such as platinum, silver, etc., after which the metallic coating is etched in a well known manner so as to cut down the thickness of the film to a thin coating, say about 2/1000ths of an inch, more or less. As will be seen by reference to the drawing, the light is thrown from screen D against the metallized surface $g$ of mirror G, the same acting to reflect the light onto the metallized surface $f$ of transparent mirror F, the metallized surfaces $f$ $g$ of the two mirrors being in opposing relation so as to obviate the optical condition of parallax by precluding the refraction of the light rays.

As shown in Figure 1 the concealed mirror G is positioned above the transparent visible mirror F, the observation opening $a'$ being at the bottom of the stage setting; but these conditions may be reversed as shown in Figure 2, wherein the stage setting is shown as having a tunnel $a^6$ at the bottom, and the observation opening $a'$ at the top. The screen D for the background projector E is at one end of the tunnel and the non-visible mirror G is at the opposite end of said tunnel $a^6$. Screen B for displaying to the view of the audience the foreground pictures is intermediate the projector C and observation opening $a'$, and in front of said screen B is the transparent mirror F, the latter being inclined to the plane of screen B. The two mirrors F G are inclined to their respective screens B D and parallel to each other, the metallized surfaces $f$ $g$ of mirrors F G respectively being in opposing or facing relation.

A further modification is shown in Figure 4 wherein the stage setting A' is constructed to accommodate the screens and mirrors to projectors C E positioned for throwing the beams of light on diverging lines instead of in parallel planes as in Figures 1 and 2. The screen B is perpendicular to the horizontal axis of the stage setting and in rear of observation opening $a'$ and the transparent mirror F, whereas the screen D is positioned in the setting A' at the angle to the plane of screen B, said screen D being perpendicular to the beam of light from projector E. The non-visible mirror G is at an angle to the plane of inclined screen D for reflecting the images onto visible mirror F, as depicted by the arrows, and the metallized surface $g$ of non-visible mirror G is in facing relation to the metallized surface of the transparent visible mirror F.

Figure 3:
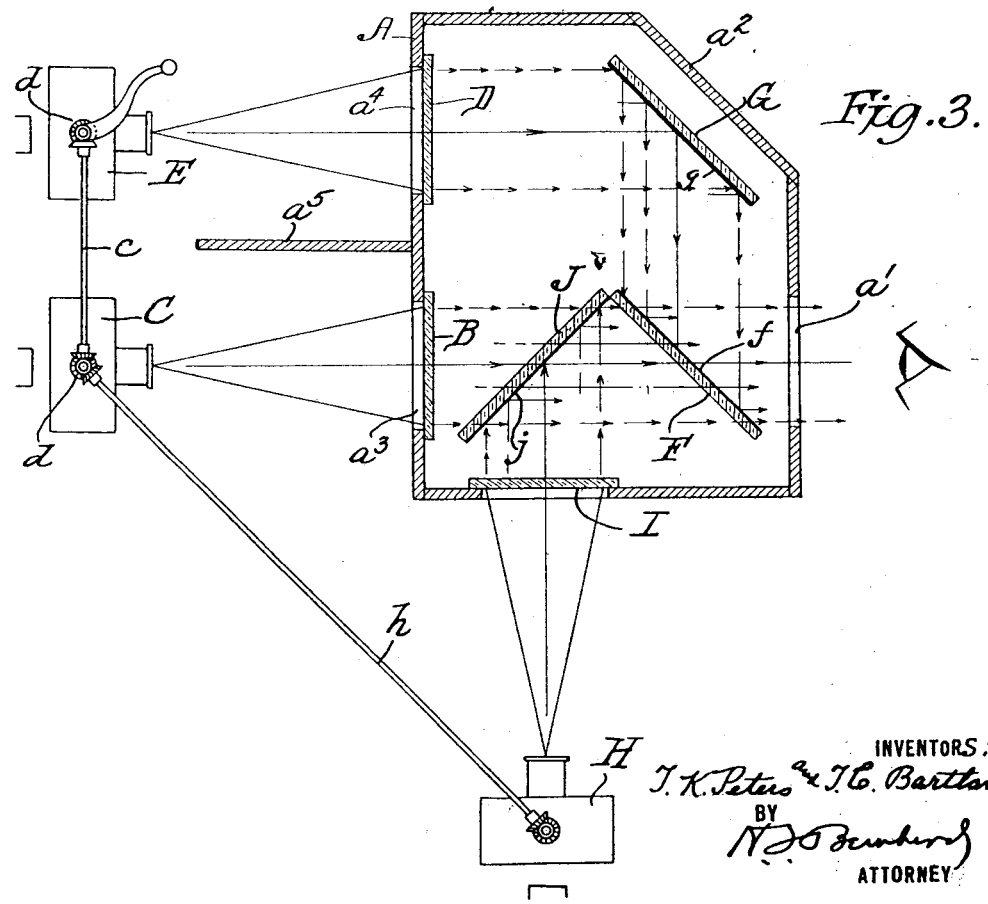

In the machines heretofore described and shown in Figures 1, 2 and 4, two projectors C, E, two screens B, D, and two mirrors F, G, are used for displaying foreground pictures and background pictures in superposed relation; but the principal invention is not restricted to the exhibition of two series of such pictures, for the reason that a desired number of projectors may be used for displaying a desired number of pictures within view of the audience. Thus, in Figure 3 there is shown a form of apparatus wherein foreground pictures are exhibited by projector C and screen B, and reflected background pictures are displayed by projector E, screen D and mirrors F, G, and in addition thereto pictures representing an intermediate ground are adapted to be displayed by a third projector H, screen I and mirror J. As shown, the projector H throws a succession of pictures onto screen I, the action of said projector H being synchronized by shaft $h$ geared to projector C. Screen I is at a right angle to the plane of screens B D and perpendicular to the beam of light from projector H. Transparent mirror F is intermediate opening $a'$ and screen B, and between the screen B and mirror F is interposed the transparent mirror J, the latter being at an angle to screens B I and at a right angle to mirror F. The metallized surface $f$ of mirror F is in opposing relation to the similar surface $g$ of mirror G, but the third mirror J is provided with a metallized surface $j$ which faces toward the screen I so as to reflect the images thrown against the screen I by projector H, the two mirrors F J being transparent so as to permit the audience to view the foreground pictures thrown on screen B by projector C and to reflect into the view of the audience the pictures thrown on screens D I by the projectors E H respectively, thus giving the effect of superposed pictures from the projectors C E H with appreciable intervals of separation between the pictures representing the foreground, the background and the middle or intermediate ground.

In Figures 5 and 6 we have shown the effects obtained by the two projectors and the two screens, whereas Figure 7 represents the effect due to the reflection of the background pictures in connection with the rearwardly visible screen. The screen B of Figure 6 in conjunction with the projector C shows a succession of pictures representing the foreground; screen D of Figure 5 combined with projector E is adapted to have background pictures thrown thereon, whereas mirrors F G reflect into the path of the beam from projector C the images from the screen D so that the background pictures appear to the eye as being in superposed relation to the foreground pictures with an appreciable interval separating the two said pictures, the reflected pictures from screen D appearing to the eye of the observer as lying in a plane rearwardly of the foreground pictures displayed on screen B.

Although we have herein described various alternative embodiments of our invention, it should be understood that various features thereof may be independently employed, and also that numerous additional embodiments might be devised, by those skilled in the art to which this case relates, without the slightest departure from the spirit and scope of the present invention, as set forth above and in the accompanying claims.

Having thus fully described the invention, what we claim as new and desire to secure by Letters Patent is:

1. In a picture exhibiting machine, a plurality of screens, one of which is normally exposed to view, a plurality of projectors for throwing pictures on the screens, a transparent mirror in the plane of that screen which is normally exposed to view, and means for reflecting the pictures thrown on the other screen onto said transparent mirror.

2. In a picture exhibiting machine, a plurality of screens one of which is normally exposed to view and the other of which is positioned out of the line of vision, a plurality of projectors each operating to throw pictures on one of said screens, a mirror having the capacity for reflecting images and of being transparent, said mirror cooperating with that screen which is normally visible so that the pictures thrown thereon are visible through said screen, and a second mirror in cooperative relation to that screen which is out of the line of vision and to the first mirror, said second mirror reflecting onto the first mirror the pictures thrown on the non-visible screen.

3. In a picture exhibiting machine, a plurality of screens one of which is normally exposed to view and the other of which is concealed, a plurality of projectors each operating to throw pictures on one of said screens, a mirror cooperating with the visible screen, said mirror having a thin metallized surface and adapted to be rendered transparent by a beam of light from that projector which throws pictures on the visible screen, and a second mirror cooperating with the concealed screen and the first mirror.

4. In a picture exhibiting machine, a plurality of screens one of which is normally exposed to view and the other of which is concealed, each mirror including a metallized surface, a plurality of projectors each operating to throw pictures on one of said screens, and a plurality of mirrors each cooperating with one screen, the metallized surfaces of said mirrors being in opposing relation to each other.

5. In a picture exhibiting machine, a plurality of screens one of which is normally exposed to view and the other of which is concealed, a plurality of projectors each operating to throw pictures on one of said screens, a mirror positioned at an angle to the visible screen and in line with the beam of light from the projector which throws pictures onto the visible screen, and a second mirror at an angle to the concealed screen and having a metallized surface on that face which is in opposing relation to the first mirror.

6. In a picture exhibiting machine, a plurality of screens, one of which is normally visible and the other is concealed, a plurality of projectors each operating to throw pictures on one of said mirrors, means for synchronizing the action of said projectors, and a plurality of mirrors positioned in cooperative relation to the respective screens and to each other, each mirror being at an angle to one of said screens.

7. In a picture exhibiting machine, a screen and a projector for throwing pictures thereon, a second screen and a second projector for throwing pictures thereon, a mirror provided with a metallized surface, said mirror cooperating with the first screen and rendered transparent by the beam of light from the first projector, and a second mirror for reflecting against the transparent mirror the images thrown on the second screen, said first and second mirrors having metallized surfaces in opposing relation.

8. In a picture exhibiting machine, a screen and a projector for throwing thereon pictures representing a foreground, a second screen and a second projector for throwing on the second screen pictures representing a background, a mirror cooperating with the first screen and positioned in the path of the beam of light from the first projector so as to be rendered transparent for viewing the foreground pictures on said first screen, and a second mirror for reflecting onto the first mirror the pictures representing the background so as to obtain an effect of a plurality of pictures in superposed relation and with an appreciable interval separating the foreground pictures from the background pictures.

In testimony whereof we have signed our names hereto this 16th day of October, 1920.

THOMAS K. PETERS.
THOMAS G. BARTLAM.